(12) United States Patent
Christo

(10) Patent No.: US 7,151,266 B1
(45) Date of Patent: Dec. 19, 2006

(54) NUCLEAR CARGO DETECTOR

(75) Inventor: Steven Basil Christo, Gloucester Point, VA (US)

(73) Assignee: Southeastern Univ. Research Assn., Newport News, VA (US)

( * ) Notice: Subject to any disclaimer, the term of this patent is extended or adjusted under 35 U.S.C. 154(b) by 407 days.

(21) Appl. No.: 10/412,990

(22) Filed: Apr. 14, 2003

(51) Int. Cl.
*G01T 1/18* (2006.01)
*H01J 47/06* (2006.01)

(52) U.S. Cl. .............. 250/385.1; 250/374; 250/336.1; 340/600; 340/500

(58) Field of Classification Search ............ 250/385.1, 250/374, 336.1; 340/600, 500
See application file for complete search history.

(56) References Cited

U.S. PATENT DOCUMENTS

| 4,320,418 | A | * | 3/1982 | Pavliscak | ................... | 348/797 |
| 4,956,557 | A | * | 9/1990 | Vlasbloem | ............... | 250/385.1 |
| 5,002,720 | A | * | 3/1991 | Berggren | ................... | 376/154 |
| 6,845,873 | B1 | * | 1/2005 | Chattey | .................... | 212/270 |
| 2003/0201394 | A1 | * | 10/2003 | Peoples | .................. | 250/336.1 |

* cited by examiner

*Primary Examiner*—Otilia Gabor
*Assistant Examiner*—Christine Sung

(57) ABSTRACT

Apparatus for the inspection of cargo containers for nuclear materials comprising one or more arrays of modules comprising grounded, closed conductive tubes filled with an ionizing gas mixture such as, but not limited to, Argon:$CO_2$. A wire is suspended along each tube axis and electrically connected at both ends of the tube. A positive, dc high voltage is supplied to one end of the wire and an amplifier is attached to the other end through a capacitance to decouple the amplifier from the high voltage. X-rays, gamma rays or neutrons produced by nuclear material and passing through the tube ionize the gas. The electrons from the gas ionization process are accelerated toward the wire surface due to the wire's electrical potential. The acceleration of the electrons near the wire's surface is sufficient to ionize more gas and produce an amplification of electrons/ions that create a surge of current large enough to be detectable by the amplifier. Means are also provided for a warning device coupled to the amplifier.

6 Claims, 2 Drawing Sheets

NUCLEAR CARGO DETECTOR

The United States of America may have certain rights to this invention under Management and Operating Contract DE-AC05-84ER 40150 from the United States Department of Energy.

FIELD OF THE INVENTION

The present invention relates to an apparatus for the detection of nuclear devices and more particularly to such a device useful in the detection of nuclear materials, i.e. materials that emit X-rays, gamma rays and/or neutrons, contained in, for example, shipping containers, trucks or air cargo containers.

BACKGROUND OF THE INVENTION

With the increasing terrorist threat related to so-called dirty bombs, i.e. conventional munitions associated with nuclear materials, or for that matter the threat of the importation of small nuclear devices, the demand for a greater level of inspection of foreign cargo arriving in the U.S. has increased dramatically.

In the Port of New York, it is estimated that U.S Customs inspects only about 2 percent of the cargo that arrives from overseas. In view of the terrorist threat alluded to above, it has been argued that every container should be inspected, however it is further estimated that in the Ports of New York and New Jersey increasing the examination rate to only 5 percent would generate a backlog of 4500 containers monthly, require an additional 400 inspectors and cost industry and extra $1.2 million per month.

The current method of radiation detection for cargo containers involves the use of handheld detectors. In addition to the time involved in sweeping an entire container with a handheld device there is also the potential for the introduction of operator error into the measurements as techniques undoubtedly vary from operator to operator. Thus, even with currently available devices the problem remains one of available manpower to adequately accomplish the very large challenge of 100 percent inspection.

Thus, the availability of a device that would permit up to 100 percent inspection of incoming cargo containers for the presence of nuclear materials, i.e. materials that emit X-rays, neutrons and/or gamma rays would be highly desirable.

OBJECT OF THE INVENTION

It is therefore an object of the present invention to provide a device that is capable of inspecting incoming cargo containers for the presence of nuclear materials in a manner and in a time span that would allow for virtually 100 percent inspection of incoming cargo containers without the addition of significant numbers of inspecting personnel or the creation of excessive backlogs.

SUMMARY OF THE INVENTION

According to the present invention there is provided an apparatus for the inspection of cargo containers for the presence of nuclear materials that requires only a single operator or technician at any loading/unloading station. The apparatus of the present invention comprises one or more arrays of modules consisting of one or more closed conductive plastic or metal tubes filled with an inexpensive and safe ionizing gas mixture such as, but not limited to, Argon:$CO_2$ to detect X-rays or gamma rays. Adding a thin film of $B^{10}$ and polyethylene to the interior of the tubes will make them sensitive to neutrons. Each tube contains a fine wire suspended along its central axis and attached at both ends of the tube with crimp or other suitable connections. A low-power, positive, dc high voltage supply or battery is attached to one end of the wire and an amplifier is attached to the other end of the wire through a capacitance to decouple the amplifier from the high voltage. Each of the tubes is maintained at ground potential. Charged particles passing through the tube ionize the gas. The electrons from the gas ionization process are accelerated toward the wire surface due to the wire's electrical potential. The acceleration of the electrons near the wire's surface is sufficient to ionize more gas and produce an amplification of electrons/ions that create a surge of current large enough to be detectable by an inexpensive amplifier.

In its simplest two-dimensional form, the device can detect whether or not a container harbors X-ray, gamma ray and/or neutron emitting materials and (depending upon the size of the individual tubes) give some idea of the location of the material along the axis of the container. With the application of multidimensional arrays, the device can pinpoint a location of the material within a few centimeters in space.

DETAILED DESCRIPTION

The method and apparatus for the detection of nuclear materials in cargo containers described herein is one that has been used in high school physics experiments for the detection of X-ray and gamma ray emitting materials for many years. To the best of our knowledge however, it has never been incorporated into a system that could be used for the purpose described herein or configured as described herein for the detection of nuclear materials in cargo containers.

Figure 1:
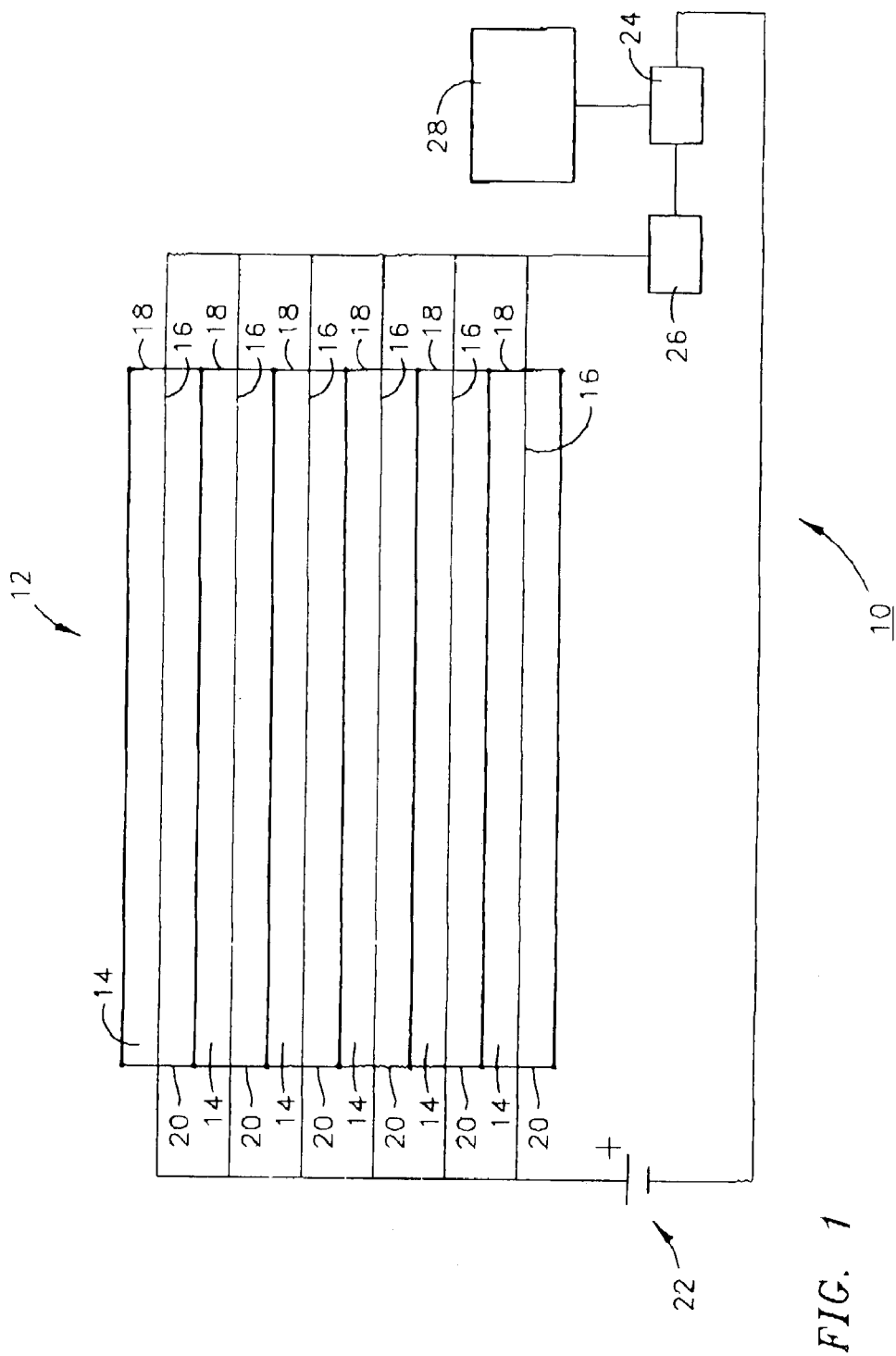
FIG. 1 is a cross-sectional view of one unit of a tube of array of the type described herein.

Referring now to FIG. 1 that depicts a simplified cross-section of a detector module 10 of the type described herein, detector module 10 of the present invention comprises an array 12 of conductive plastic or metal tubes 14 each having a thin wire 16 extending from one end 18 thereof to the other end 20 thereof. Wires 16 are connected at end 20 to the positive electrode of a high power dc power source or battery 22. At opposing end 18, wires 16 are attached to an amplifier 24 through a resistance 26 that decouples the dc voltage from amplifier 24 except in that case where adequate charge has been produced sufficient inonization within tubes 14 as to generate an electrical charge adequate to activate amplifier 24. A display or warning device 28 is connected to amplifier 24 to produce an audible or visible signal that indicates the presence of radioactive, i.e. X-ray, gamma ray and/or neutron emitting material in the vicinity of detector module 10. Each of tubes 14 contains an ionizable gas or mixture of gases that is ionizable in the presence of X-rays, gamma rays or neutrons. While a mixture of Argon; $CO_2$ provides a preferred such gas, any number of other well known and suitable ionizable gases or mixtures of gases can also be utilized. Among such gases and mixtures of gases are $He_3$, $BF_4$, ethane/$CO_2$, methane/$CO_2$ or mixtures of such gases. As previously stated hereinabove, coating the interior of tubes 14 with a thin layer of $B^{10}$ in polyethylene facilitates the detection of neutrons in the apparatus and method of the present invention.

Figure 2:
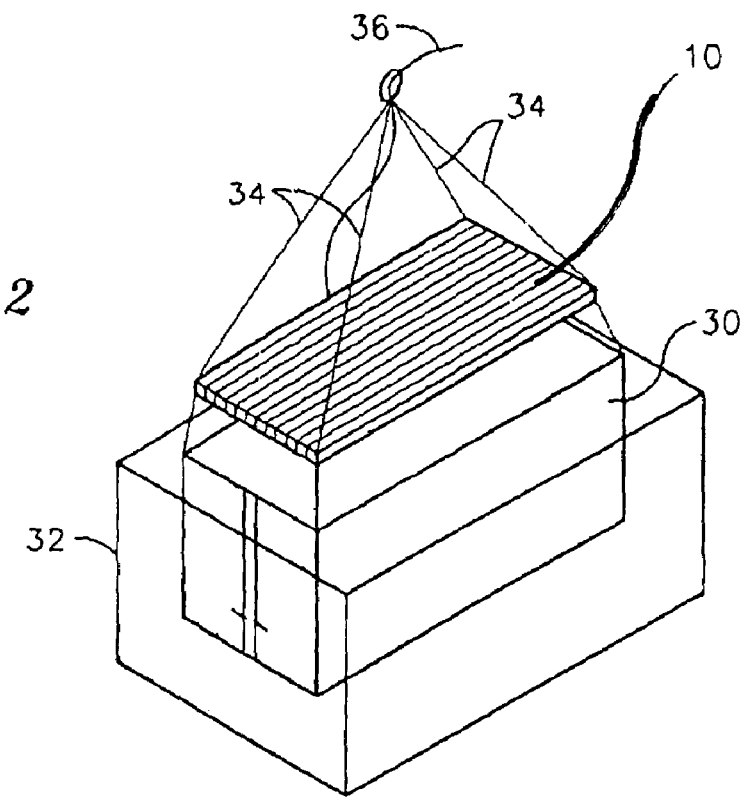
FIG. 2 is a perspective view of the cargo container screening system of the present invention.

Referring now to FIG. 2 that depicts a suitable arrangement for the use of the detector module(s) 10 of the present invention, a cargo container 30 is placed in a loading or unloading station 32 and a detector module 10 comprising an array of tubes as described above is lowered using a suitable overhead crane arrangement 34 or the like. A cable 36 connects the output of detector module 10 to an amplifier/warning device as previously described. Since loading and unloading station 30 as well as overhead cranes 34 already exist at all port facilities, the only additional equipment required is the tubular detector array constituting detector module 10 previously described. The time required to locate detector module 10 over cargo container 30 and to obtain an indication of the presence of radioactive material is on the order of a few minutes. The measurement and placement of detector module 10 is highly repeatable.

Figure 3:
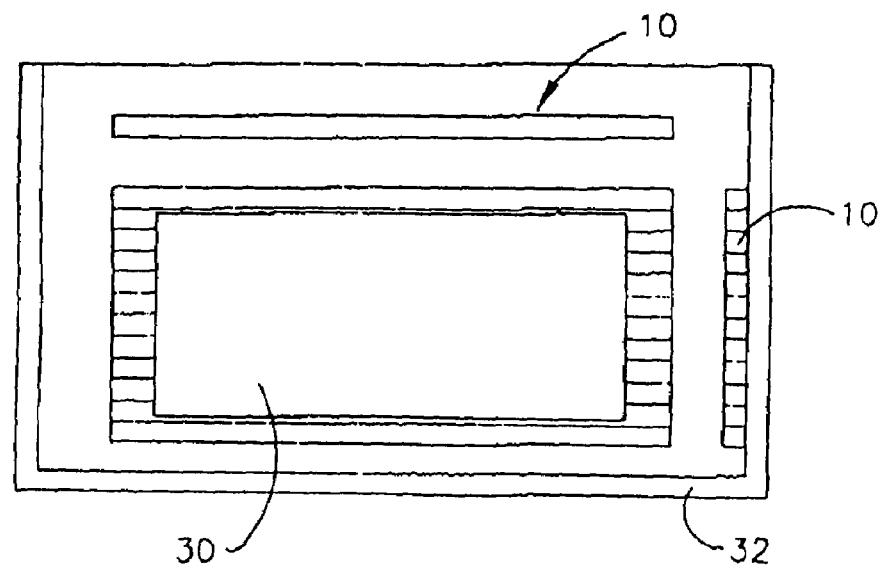
FIG. 3 is a top plan view of the cargo container screening system of the present invention.

As shown schematically in FIG. 3, the incorporation of a second detector module 10 into the side of cargo loading or unloading station 32 can provide additional spatial location information regarding any radioactive material and the further incorporation of yet a third module 10 into the end of cargo loading and unloading station 32 can provide virtually exact spatial location of any radioactive material contained in cargo container 30. The methods and techniques for incorporating such additional dimensional aspects to the basic invention of the present invention are well known and well within the skill of practioners in the detection of X-ray, gamma ray and/or neutron emitting substances, especially the medical arts where such materials are often used in the location of lesions and the like.

In use the apparatus of the present invention is co-located with a container, truck or the like for inspection as depicted, for example in FIG. 3, and radioactive emissions from the container or the like cause the gas in tubes 14 to ionize. Each of the tubes is maintained at ground potential. Charged particles from the radioactive source pass through the tube and ionize the gas. The electrons from the gas ionization process are accelerated toward the wire surface due to the wire's electrical potential. The acceleration of the electrons near the wire's surface is sufficient to ionize more gas and produce an amplification of electrons/ions that create a surge of current large enough to be detectable by an inexpensive amplifier.

There has thus been described an apparatus for the detection and location of radioactive materials contained in a cargo container. The device described herein is readily incorporated into current existing cargo handling systems and should permit substantially 100 percent inspection of cargo containers without the need for either very large capital investment or the addition of very large numbers of additional personnel.

As the invention has been described, it will be apparent to those skilled in the art that the same may be varied in any ways without departing from the spirit and scope thereof. Any and all such modifications are intended to be included within the scope of the appended claims.

What is claimed is:

1. Apparatus for the inspection of cargo containers for nuclear materials comprising:
   A) one or more arrays of modules, each of said arrays comprising:
      i) a plurality of grounded, closed conductive tubes having an thin interior coating of $B^{10}$ in polyethylene and a central axis and filled with a gas mixture ionizable in the presence of radioactive emissions;
      ii) a wire having opposing ends suspended along each of the tube axes;
      iii) a positive dc high voltage source applied to one end of each of the wires; and
      iv) an amplifier attached to the opposing end of each of said wires through a capacitance to decouple the amplifier from the high voltage;

whereby in the presence of a source of X-rays, gamma rays and/or neutrons, such as nuclear material, X-rays, gamma rays and/or neutrons passing through the tubes ionize the gas in the tubes producing electrons or ions by the gas ionization process, said electrons are accelerated toward the wire surface due to the wire's electrical potential, the acceleration of the electrons near the wire's surface being sufficient to ionize more gas and produce an amplification of electrons/ions that creates a surge of current large enough to be detectable by the amplifier.

2. The apparatus of claim 1 further including a visible or audible warning device for indicating the presence of nuclear material when a surge of current is detected by said amplifier.

3. The apparatus of claim 1 wherein said ionizable gas is selected from the group consisting of argon/$CO_2$, $He_3$, ethane/$CO_2$, methane/$CO_2$ and mixtures of such gases.

4. Apparatus for the inspection of cargo containers for nuclear materials comprising:
   A) a mechanism for placing a cargo container for inspection proximate a nuclear materials detection system comprising:
      I) one or more arrays of modules, each of said arrays comprising:
         a) a plurality of grounded, closed conductive tubes having an thin interior coating of $B^{10}$ in polyethylene and a central axis and filled with a gas mixture ionizable in the presence of radioactive emissions;
         b) a wire having opposing ends suspended along each of the tube axes;
         c) a positive dc high voltage source applied to one end of each of the wires; and
         d) an amplifier attached to the opposing end of each of said wires through a capacitance to decouple the amplifier from the high voltage;

whereby in the presence of a source of X-rays, gamma rays and/or neutrons, such as nuclear material, X-rays, gamma rays and/or neutrons passing through the tubes ionize the gas in the tubes producing electrons or ions by the gas ionization process, said electrons are accelerated toward the wire surface due to the wire's electrical potential, the acceleration of the electrons near the wire's surface being sufficient to ionize more gas and produce an amplification of electrons/ions that creates a surge of current large enough to be detectable by the amplifier.

5. The apparatus of claim 4 further including a visible or audible warning device for indicating the presence of nuclear material when a surge of current is detected by said amplifier.

6. The apparatus of claim 4 wherein said ionizable gas is selected from the group consisting of argon/$CO_2$, $He_3$, ethane/$CO_2$, methane/$CO_2$ and mixtures of such gases.

* * * * *